Oct. 30, 1956 R. W. KREBS ET AL 2,768,974
OXO PROCESS
Filed March 25, 1952
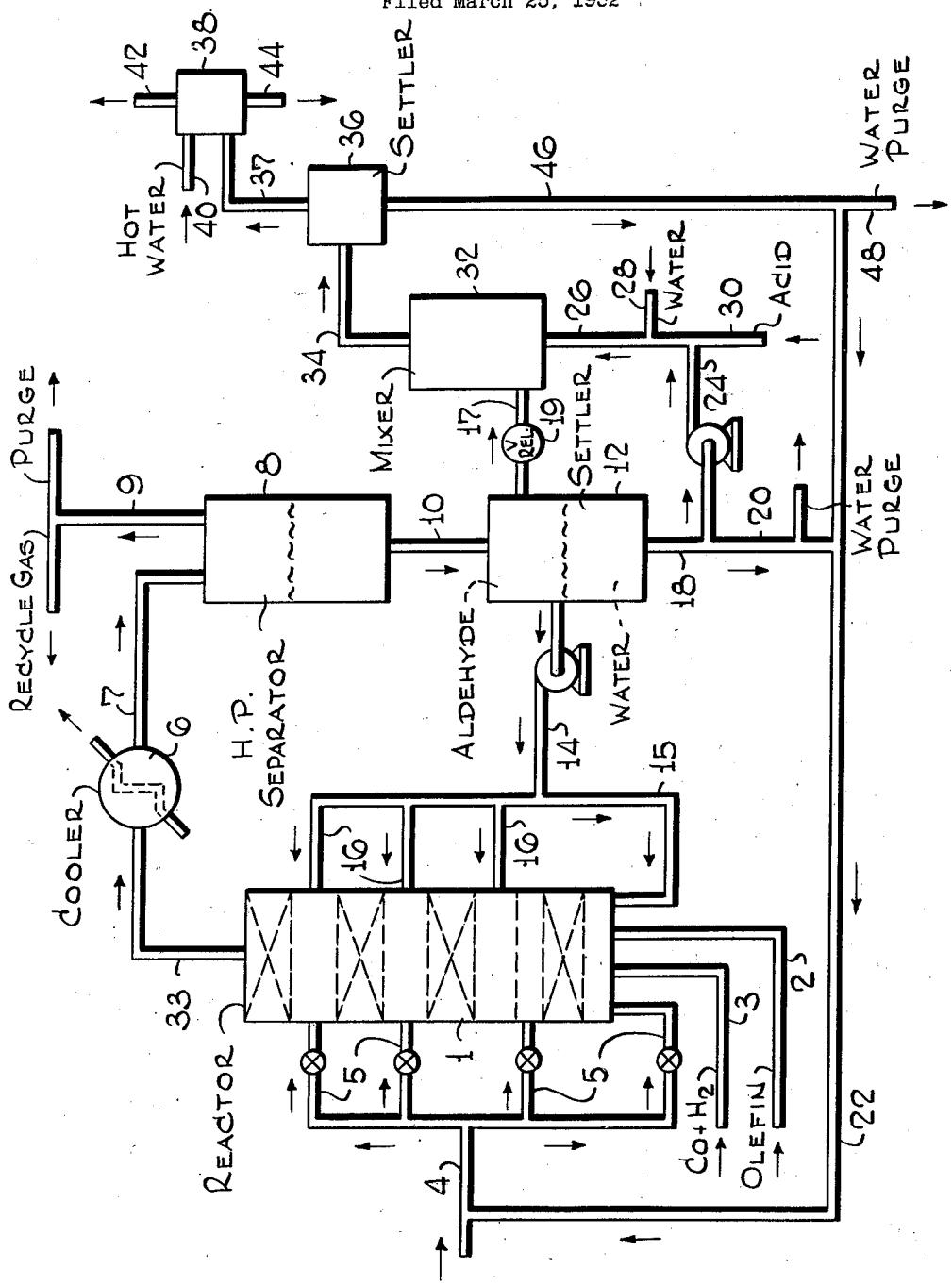
Robert W. Krebs
William E. Catterall  Inventors
By Henry Burk  Attorney

United States Patent Office 2,768,974
Patented Oct. 30, 1956

2,768,974

OXO PROCESS

Robert W. Krebs, Baton Rouge, La., and William E. Catterall, Roselle, N. J., assignors to Esso Research and Engineering Company, a corporation of Delaware Application March 25, 1952, Serial No. 278,368

2 Claims. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the product of the first stage of the cobalt carbonylation reaction for further use in the process. The invention still further relates to the successful employment of water-soluble catalyst in the continuous reactions.

It is well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate, or iron linoleate. These salts are soluble in the liquid olefin feed and may be supplied to the first stage as hydrocarbon solution or dissolved in the olefin feed. Also, water-soluble catalysts have been suggested, as well as slurries of oil- and water-insoluble forms of cobalt.

The synthesis gas mixture fed to the first stage may consist of almost any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500° to 4500 p. s. i. g., and at temperatures in the range of about 150–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage as well as to the first stage, that the present principal invention applies.

From the catalyst removal zone, the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl and hydrocarbonyl. There is basis for the belief that the metal hydrocarbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is therefore removed in the catalyst removal, or decobalting zone.

One way to remove the cobalt is by a thermal method wherein the accrued product in the first stage is heated to a temperature of from about 300–350° F. Conveniently, a steam coil immersed in the liquid to be decobalted is employed. A pressure of from about 100–175 p. s. i. g. is maintained in the decobalting zone by the injection of a gasiform material, such as hydrogen, an inert vapor, etc., whereby the CO partial pressure is maintained at a relatively low value in the decobalting zone. Periodically, it is necessary to take the decobalter off stream to remove accumulated metallic cobalt to prevent plugging of feed lines and adjacent areas of the decobalting vessel. Furthermore, cobalt metal deposits as a film on the heating means and requires constant removal to prevent plugging of the pretreating equipment and surfaces. The removal of these films and deposited cobalt metal is a tedious and difficult process and adds significant cost to the economics of the carbonylation reaction. Furthermore, thermal decobalting usually did not completely remove soluble cobalt from the aldehyde product.

These difficulties were to a great extent removed, and a long step forward was taken, when it was found that when the aldehyde product comprising the reactor effluent from the carbonylation zone was treated with dilute aqueous solutions of organic acids such as acetic or formic, whose cobalt salts are somewhat water soluble and oil insoluble, considerably more efficient decobalting was obtained, with residual cobalt content of the aldehyde product less than 10 parts per million. The thermal decobalting process frequently left a feed for the subsequent hydrogenation process containing from 100–500 parts per million of dissolved cobalt. This resulted from the fact that though cobalt carbonyl is readily decomposed at the thermal conditions, other compounds of cobalt, such as cobalt soaps and salts, are quite stable at these temperatures. Cobalt salts such as cobalt formate, in the aldehyde product originate from the formation of secondary reaction products, such as formic, and higher fatty acids in the course of the reaction and from the fatty acid cobalt soaps originally added as catalyst.

An important advantage of acid decobalting, besides the fact that lower temperatures are required than in thermal decobalting, is that cobalt recovery is considerably simplified and made more feasible. Because of the strategic importance of this metal, it is essential for an economically feasible process that substantially all the metal be recovered and reutilized. Thus, instead of precipitating the metal as a solid on packing, tubes, reactor walls, etc., as in the prior art processes, the effect of aqueous organic acid injection is to convert substantially all the cobalt present in the aldehyde product into a water-soluble form, regardless in what form cobalt is present in the aldehyde, and this aqueous stream is readily separated from the decobalted product.

While this technique is quite effective, it presents a serious problem. It is necessary to add enough acid to combine with at least all the cobalt present in the aldehyde product to produce the corresponding cobalt salt, such as cobalt acetate. However, the cobalt salts of the lower fatty acids have a limited water solubility, and therefore there must be present enough water to dissolve all of the cobalt salts formed. This results in the recovery of quite dilute solutions of cobalt from the decobalting process.

The utilization of this aqueous cobalt stream, however, which may have a cobalt concentration of from 1 to 8%, thus poses several real problems. The most obvious and direct method of utilization consists of recycling directly the aqueous stream to the aldehyde synthesis reactor. This step, however, in the past has not been thought desirable because it introduces relatively large quantities of water into the reactor oven, and results in flooding and quenching of the reactor. Under certain circumstances, a limited amount of water in the primary reactor is beneficial, but under other circumstances, particularly when the cobalt concentration of the recovered aqueous stream is dilute, i. e., about 1 to 4% cobalt, flooding is very likely to occur if it is attempted to recycle enough to provide adequate catalyst concentration in the reactor oven corresponding to 0.2 to 0.4% cobalt on olefin.

The beneficient effects of the use of water in the Oxo process, however, have been recognized. Thus it has been proposed to add water to the process to increase the selectivity to the desired alcohols at the expense of undesired secondary reaction products. Likewise, it is also desirable in some instances, as has been pointed out, to add the cobalt catalyst in the form of a water solution of some water-soluble salt, such as cobalt acetate; it may even be desirable to employ this method of adding cobalt originally, that is, adding the catalyst originally to the aldehyde synthesis reactor as the water soluble salt. Water soluble salts of cobalt are considerably cheaper than the oil-soluble soaps. However, this method is limited by the solubility of the low-molecular weight organic salts of cobalt in water. In general, it is desirable not to employ inorganic salts in the process because of contamination and corrosion problems. Thus, in order to avoid accumulating a large amount of liquid water in the reaction vessel, it has been necessary to limit the water addition, in a continuous upflow operation, to that amount which can be dissolved and carried out with the effluent liquid stream. When the water is added with the olefin therefore, in the usual upflow system, this limits the amount of water added to that amount which can be dissolved in the olefin feed at inlet conditions, for, as pointed out, if this solubility limit is exceeded, liquid water tends to accumulate in the bottom of the reactor, eventually filling it up, thus limiting the amount of water which can be added to a very low value, depending upon the solubility of water in the hydrocarbon feed. Since the solubility of organic cobalt salts in water is low, this presents a particularly troublesome problem, for if the solubility of water in olefin is also limiting, the ratio of cobalt to olefin, which is a major factor in controlling the degree and extent of conversion is also exceedingly low.

From the above discussion the economic advantages of using a source of cobalt, such as cobalt acetate, as a catalyst in the manufacture of primary alcohols by the Oxo process, are great. This is particularly true when the decobalting is carried out by means of an aqueous organic acid, such as aqueous acetic, in which case the cobalt is recovered as an aqueous cobalt salt solution, and it would be highly desirable to recycle the recovered cobalt solution directly to the aldehyde synthesis reactor without further processing. However, as has been pointed out, the concentration of cobalt in this solution may only be about 2.5–5% by weight, owing to the limited solubility of the recovered cobalt salt, combined with the necessity of completely removing cobalt in the decobalting operation. Furthermore, the presence of formic acid produced almost invariably as a by-product in the first stage aldehyde synthesis reaction also has an adverse effect on the solubility of the cobalt salt, such as cobalt acetate. Therefore in order to obtain the desirable catalyst concentrations and proportions of up to 0.3 wt. percent cobalt on olefin feed, it would be necessary to add up to 12 wt. percent saturated cobalt acetate solution on olefin feed to the Oxo reactor, which would involve rapid reactor flooding and reaction quenching.

Thus, in a commercial plant, it has been demonstrated that only about 1.5% by weight of water can be added with the feed to the upflow aldehyde synthesis reactor. Additional quantities of water remain in the reactor, eventually filling the vessel completely. Thus, in conventional operation, as little as only 15% of the desired catalyst rate could be supplied by direct injection of the cobalt acetate solution.

It is, therefore, the principal purpose of the present invention to disclose an improved process whereby water and dissolved water soluble catalyst may be injected into the aldehyde reaction zone without flooding the reactor and quenching the reaction.

It is also a purpose of the present invention to provide a process for recycling dissolved water soluble catalyst to the reaction without requiring processing of such aqueous catalyst streams.

A still further object of the present invention is to disclose a means whereby high catalyst concentrations may be maintained throughout the reactor.

Other and further objects and advantages of the invention will be in part evident and will in part appear hereinafter.

These objects and advantages may, in brief compass, be achieved by adding at least a portion of the water and dissolved catalyst to the reactor at a point, and preferably at a plurality of points, where an appreciable share of the olefins have been already converted to aldehydes. The solubility of water in aldehydes is substantially greater than that in olefins, so that at the intermediate points of injection the reaction stream can dissolve substantially larger amounts of water than at the olefin feed inlet point and adjacent area.

Thus by the injection of additional quantities of the dissolved aqueous catalyst solution at the intermediate point or points, throughout the aldehyde synthesis reaction zone, the full amount of catalyst may be added as dissolved cobalt acetate without flooding the reactor, while continuing to employ the desirable, and conventional upflow concurrent flow arrangement. The capacity of the aldehyde synthesis reaction mixture for dissolving water greatly increases as the mixture progresses through the reaction zone, thus permitting addition of further amounts of water progressively throughout the reaction zone without exceeding the water solubility and accumulating water in the reactor. This is particularly true if undissolved water resulting from phase separation in the subsequent gas-liquid high pressure separation zone is separated from recycle first stage cooling product, added at various levels and points throughout the reactor for providing cooling to the highly exothermic aldehyde synthesis reaction. A further advantage of adding water downstream from the olefin inlet area is that more water surface is thus exposed, as the water trickles down the reactor; better contact of gas and liquid with water is thus achieved, which aids in saturating both the gas and liquid streams, thus further helping in carrying the water out of the reaction vessel.

The solubility of water in Oxo streams is given in the following table: a C7 olefin obtained by polymerizing butylene and propylene is the feed to the Oxo process, and a C8 iso-octyl aldehyde is the conversion product. Tests were carried out in the presence of 1/1 $H_2/CO$ gas.

| Equivalent Conversion | 0 | 0 | 19 | 25 | 25 | 32 | 32 | 75 | 75 |
|---|---|---|---|---|---|---|---|---|---|
| Wt. Percent Aldehyde | 0 | 0 | 23 | 30.7 | 30.7 | 38.3 | 38.3 | 80 | 80 |
| Wt. Percent Olefin | 100 | 100 | 77 | 69.3 | 69.3 | 61.7 | 61.7 | 20 | 20 |
| Temp., °F | Room | 350 | 225 | 225 | 350 | 225 | 350 | 70 | 350 |
| Pressure, p. s. i. g | 2,800 | 2,800 | 2,800 | 2,800 | 2,800 | 2,800 | 2,800 | 2,800 | 2,800 |
| Water solubility, Wt. Percent | 0.1 | 0.2 | 0.3 | 0.5 | 1.4 | 0.5 | 2.3 | 0.7 | 5.0 |

The above data show that the water solubility is increased by (1) increase in oxygenated content and (2) increase in temperature. Thus, as the reaction progresses the water solubility potential also increases because of the increased oxygenated content. Also, as made more clear below, injection of reactor product as cooling medium at multiple points along the flow of product stream within the synthesis reactor also serves to enrich the stream in oxygenated compounds as it progresses in the upflow reactor.

The present invention will best be understood from the more detailed description presented hereinafter, wherein reference will be made to the accompanying drawing which is a schematic illustration of a system suitable for carrying out a preferred embodiment of the invention. The system described therein is an embodiment wherein the aldehyde product is decobalted by treatment with an aqueous acid, such as acetic acid, the cobalt carbonyl being converted to a water soluble salt, and the water layer recycled at least in part to the aldehyde synthesis zone to furnish at least a portion of the catalyst requirements therein. It is to be understood that the invention is not to be limited to acid decobalting and recycling of water-soluble cobalt containing streams. Decobalting may be carried out by thermal means, or by hot water or steam, and only the catalyst is supplied to the aldehyde stage as an aqueous solution.

Turning now to the drawing, an olefinic hydrocarbon having one carbon atom less than the number of carbon atoms in the desired resulting oxygenated compound and preferably alkali washed prior to reaction is fed through feed line 2 to the bottom portion of primary reactor 1. Reactor 1 comprises a reaction vessel which may, if desired, be packed with non-catalytic material such as Raschig rings, porcelain chips, ceramic material, pumice and the like. Reactor 1 may be divided into discrete packed zones separated by any suitable means such as support grids, etc. or it may comprise but a single packed zone, or it may contain no packing.

The olefinic feed may initially contain dissolved therein 1–3% by weight of cobalt oleate based on the olefin. It is understood that other compounds of cobalt or compounds of iron or mixtures of compounds of cobalt and iron soluble in the olefins may also be used equally effectively. However, it may be desirable initially to employ, instead of an oil-soluble cobalt compound, a compound of cobalt that is water-soluble, such as the acetate, formate, etc. In such case, cobalt may be added in aqueous solution along with the water injected as below. In all events, as the reaction progresses, oil-soluble cobalt, if initially added, is cut back and all cobalt added as aqueous solution. Simultaneously, a gas mixture containing hydrogen and carbon monoxide in the approximate ratio of 0.5 to 2 volumes of hydrogen per volume of carbon monoxide is supplied through line 3 to primary reactor 1 and flows concurrently through reactor 1 with said olefin feed. Reactor 1 is preferably operated at a pressure of about 2500–3500 p. s. i. g. and at a temperature of from about 250° to 450° F. depending upon the olefin feed and other reaction conditions. The rate of flow of synthesis gases and olefins through reactor 1 is so regulated that the desired conversion level of the olefin is obtained. If it is desired to provide the water required initially for cooling and subsequent recycle, water or steam may be injected into reactor 1 through line 4 and manifold 5. However, cooling is advantageously supplied by recycle of aldehyde product as shown below. The water may, if desired, have in solution water-soluble cobalt compounds, as acetate, propionate, etc. As indicated above, extraneous water addition is preferably cut back as the reaction progresses, and water is recycled from the system, as from the acid decobalter.

The carbonylation reaction in reactor 1 is carried out substantially adiabatically, that is, no external cooling means such as by tubes or coils is provided but the cooling and temperature control is carried out in the process of the present invention as disclosed below. Liquid oxygenated reaction products containing catalyst in solution and unreacted synthesis gases are withdrawn from an upper portion of high pressure reactor 1 and are transferred through line 3 to cooler 6 in which are employed any conventional means of cooling, and from thence via line 7 to high pressure separator 8 where unreacted gases are withdrawn overhead through line 9, and used in any way desired; they may be recycled after cooling and condensation of entrained and dissolved water vapor. The synthesis gas stream flowing through reactor 1 has the capacity of carrying evaporated water, amounting to 1–2% by weight of an olefin feed at normal reactor temperatures, at an inlet gas rate per barrel of fresh feed of 5500 standard cubic feet. This about compensates for the amount of water produced as by-product in the synthesis reaction, which amounts to about 1% by weight.

Liquid aldehyde product and water supplied as shown more fully below is withdrawn from high pressure separator 8 and passed through line 10 without significant pressure release to high pressure settling zone 12. In zone 12 separation into a lower aqueous and an upper organic layer occurs. A partition of cobalt carbonyl and hydrocarbonyl formed in reactor 1 also takes place, the bulk of the carbonyl remaining in the upper aldehyde layer and a portion being dissolved in the lower aqueous layer.

A stream of aldehyde product containing dissolved therein substantial quantities of cobalt carbonyl is withdrawn from settling zone 12 and is recycled through lines 14 and 15, and manifold injector 16 to reactor 1. It is advantageous to supply this liquid to a bottom portion of this reactor as well as to the upper zones, particularly when aqueous solutions of catalyst is supplied downstream, for thus cobalt carbonyl, the active form of catalyst, is provided in the lowest zone. The amount of aldehyde recycled is a function of the amount of cooling required in reactor 1, the temperature gradient throughout the reactor being in the range of from about 30°–100° F., and the cooled aldehyde product from settler 12 being at a temperature level 200–250° F. lower than that in reactor 1. The cobalt carbonyl thus added along with the extraneously added cobalt, enables the reaction to proceed throughout the full length of the reactor, rather than only in the upper portion.

The cooling liquid is also saturated with water at the temperature existing in separator 12, which is at about 100 to 150° F., and has a substantial capacity for dissolving additional water at the temperatures existing in reactor 1, at least 4% by weight of additional water. Thus the addition of each increment of cooling liquid permits the addition of an increment of aqueous catalyst solution through lines 4 and manifold 5. Since the aqueous layer in separator 12 is not saturated with cobalt salts, it is desirable to effect separation of water from aldehyde product in this zone and not recycle the water directly. However, under certain circumstances, a limited amount of this water may be recycled through lines 18, 20 and 22. Adequate separation of suspended water from the aldehyde product in settler 12 may be carried out by such means as enlarged settling zones, coalescing filters, etc.

The balance of the aldehyde reaction product, containing dissolved therein relatively large amounts of cobalt carbonyl and other forms of cobalt, to the extent of about 2000 parts per million and more, is passed from separator 12 through line 17 and pressure release valve 19 to mixer 32. This unit is of any conventional design, and is adapted to mix thoroughly an aqueous and a water-insoluble liquid organic phase. An aqueous organic acid solution whose cobalt salts are at least partially soluble in water, is injected through lines 30 and 26 into the mixer. Suitable acids are acetic, propionic, formic, and the like. Acetic is particularly suitable, for its cobalt salts have a relatively greater water solubility than, for instance, those of formic acid, and so less water is required for their complete recovery. Acid is added in amounts sufficient at least to combine with all cobalt present, and the water dilution is adequate at least to dissolve all water-soluble cobalt salts and complexes formed. Thus, a satisfactory operation may be had employing about 5–20% by volume of a 5% aqueous solution of acetic acid. For less water-soluble cobalt salts, a greater amount of water is required.

The temperature in mixer 32 must not exceed about 200° F., and is preferably about 150–185° F., to prevent thermal instead of chemical decomposition of cobalt carbonyl.

A particularly suitable source of water for diluting the acid stream is supplied by passing at least a portion of the aqueous layer from separator 12 via lines 18 and 24 for mixing with the acid. The lower layer contains in solution cobalt compounds which are converted along with the cobalt in the aldehyde layer into water soluble cobalt salts.

After sufficient mixing and recirculation, on the order of 30–120 minutes, the mixture is pumped through line 34 to settler 36, where the aqueous and aldehyde layers are allowed to stratify. Substantially all of the cobalt is in the lower aqueous layer. The aldehyde layer may then be passed to water washing equipment 38 via line 37, where hot water at about 165° F. may be injected through line 40 to wash out the last traces of cobalt. The wash water also may, in part, be cycled to mixer 32 through line 24 as a diluent for the acid stream.

Overhead from washing equipment 38 there is withdrawn through line 42 substantially completely decobalted aldehyde product, which is then passed to the hydrogenation stage for conversion to alcohol in a manner known per se.

The aqueous lower layer from settler 36, containing relatively concentrated solution of cobalt salts, is passed via lines 46, 22, 4, and manifold 5 into aldehyde synthesis reactor, the proportion or position wherein the dissolved cobalt is injected to supply the catalyst requirements of the system, is determined by the extent of conversion in the respective zones in reactor 1, and the manifold is suitably valved to permit proportionment and adjustment of the feed. A greater proportion, and under certain circumstances, all of the added aqueous catalyst solution is added at the downstream end of the reactor than closer to the olefin injection end. Thus injection may be at only one point downstream, relatively close to the top of the reactor, the catalyst for the intermediate and bottom section being supplied by recycle of cobalt-containing first stage product as described.

The water-carrying capacity of the aldehyde synthesis reaction mixture as it progresses through reactor 1, may be shown in the following table:

| Conversion Level | 0 (Inlet) | 37.5 | 75 (Exit) |
|---|---|---|---|
| Weight Total Recycle Liquid Added, Percent FF | 0 | 125 | 250 |
| Weight Reaction Liquid, Percent Fresh Feed | 100 | 235 | 370 |
| Composition, wt. Percent Hydrocarbon | 100 | 38 | 20 |
| Water Solubility: | | | |
| Wt. Percent | 0.3 (Est.) | 3.0 (Est.) | 5.0 |
| Wt. Percent FF | 0.3 | 5.6 | 18.5 |
| Reaction Water, Wt. Percent FF | 0 | 0.5 | 1.0 |
| Recycled Water, Wt. Percent FF | 0 | 0.9 | 1.8 |
| Possible Water Addition, Wt. Percent FF [1] | 1.3 | 5.2 | 16.7 |

[1] Includes 1.0% water on fresh feed vaporized in gas stream.

The table shows that the water-carrying capacity is very low at the inlet end of the reactor, about only 1.3 wt. percent on fresh feed, which has been confirmed by actual plant experience. However, at the exit end of the reactor the capacity is very high, about 17 wt. percent on fresh feed. By the time only one-half of the final conversion is accomplished, requiring only one-third or less of the total reactor volume, the capacity for added water is about 5 wt. percent on fresh feed. This might be adequate for the full amount of catalyst, indicating that the entire amount of catalyst might be added toward the front end of the reaction zone and ample reaction space should be available for the conversion of the cobalt acetate to active catalyst. To effect simplification, it is also possible to add the full amount of cobalt acetate at only one intermediate point, say, at the 37.5% conversion level, using recycle liquid as the sole source of catalyst in the initial zones of the reactor. In this case recycle liquid is fed into the feed end of the reactor even though not required at this point for cooling purposes. Alternately, the cobalt acetate solution may be added at the front end of the reactor and at several intermediate zones.

The process of the present invention may be modified in many directions. Though a system has been described wherein the aqueous catalyst employed in the aldehyde synthesis reaction zone is prepared by acid decobalting the aldehyde product, other means of decobalting, such as thermal means in the presence of an inert gas, hydrogen, or steam or hot water, may be employed. If desired, water-soluble cobalt make-up catalyst may be added directly to the water from the lower layer in settler 12. Even aqueous slurries may be employed as catalyst. Furthermore, under some circumstances, it may be desirable to employ both water-soluble and oil-soluble catalysts, and under other circumstances it may be desirable to employ only oil-soluble catalysts, and employ water without dissolved catalyst as a means for increasing alcohol selectivity.

In an operation in which octyl alcohols were being produced by the reaction of $C_7$ olefins with carbon monoxide and hydrogen at 350° F. and 3,000 lbs. per sq. inch pressure using a feed rate of only 0.3 v./v./hr. and therefore a correspondingly low catalyst feed rate of 0.1% on feed, the following typical data were obtained using the relatively expensive oil-soluble cobalt oleate as a catalyst. 2 vol. percent water was added as an extraneous stream:

| Run Hours | Conversion, Mol. Percent | Water Balance, Percent |
|---|---|---|
| 1–8 | 74 | 73 |
| 9–16 | 73 | 90 |
| 17–24 | 72 | 95 |
| 25–32 | 73 | 111 |

In a similar operation in which the catalyst was introduced in a water soluble form as cobalt acetate along with the 2 vol. percent water and in which this stream of water was added at the bottom of the reactor with the feed, the following tabulation shows that conversion was low and erratic and water recovery was also erratic:

| Run Hours | Conversion, Mol. Percent | Water Balance, Percent |
|---|---|---|
| 1-8 | 55 | 0 |
| 9-16 | 60 | 54 |
| 17-24 | 61 | 114 |
| 25-32 | 70 | 93 |
| 33-40 | 67 | 99 |
| 41-48 | 72 | 87 |
| 49-56 | 83 | 226 |
| 57-64 | 74 | 93 |
| 65-72 | 70 | 80 |
| 73-80 | 68 | 69 |
| 81-88 | 81 | 231 |
| 89-96 | 64 | 60 |
| 97-104 | 57 | 52 |
| 105-108 | 58 | 53 |

It will be seen from the next tabulation of data that this situation was corrected by introducing the identical aqueous stream of catalyst down stream at a point approximately 75% of the reactor height above the bottom or inlet of the reactor. At this point the liquid contained an appreciable concentration of the product aldehyde, but a sufficient amount of the catalyst solution reached the bottom of the reactor to furnish catalyst throughout the entire reaction zone.

| Run Hours | Conversion, Mol. Percent | Water Balance, Percent |
|---|---|---|
| 1-8 | 69 | 99 |
| 9-16 | 72 | 82 |
| 17-24 | 70 | 116 |
| 25-32 | 71 | 100 |
| 33-40 | 70 | 84 |
| 41-48 | 71 | 50 |
| 49-56 | 71 | 84 |
| 57-64 | 71 | 81 |
| 65-72 | 71 | 59 |
| 73-80 | 70 | 78 |

The reactor used in this case had a total height of about 20″ reaction space. With deeper reaction zones it will be found advantageous to introduce the aqueous catalyst stream at several points along the reaction zone.

What is claimed is:

1. A continuous carbonylation process wherein olefinic carbon compounds are contacted in an up-flow carbonylation zone with CO and $H_2$, in the presence of a cobalt catalyst at elevated temperatures and pressures to produce aldehydes containing at least one more carbon atom than said olefinic compound and wherein the water solubility of the product mixture in the carbonylation zone increases as the product mixture travels downstream from an inlet for the olefinic compound to an exit point, the improvement which comprises adding an aqueous solution of an organic cobalt compound at a plurality of points in increasing amounts corresponding with the increasing water solubility of said product mixture at said points, said aqueous solution being added in an amount sufficient to maintain the water concentration in the carbonylation zone between about 1.3 wt. percent near the olefinic feed inlet and 16.7 wt. percent near the exit point of the carbonylation zone, based on the fresh olefinic feed, said amount being sufficient to supply at least the major portion of the catalytic requirements for said carbonylation zone.

2. The process of claim 1 wherein said organic cobalt compound is cobalt acetate.

References Cited in the file of this patent
UNITED STATES PATENTS

| 2,557,701 | Smith | June 19, 1951 |
| 2,564,104 | Gresham et al. | Aug. 14, 1951 |

FOREIGN PATENTS

| 647,363 | Great Britain | Dec. 13, 1950 |

OTHER REFERENCES

I. G. Farbenindustrie, German Patn. Appl'n. O.Z. 13,705, T.O.M. Reel 36, Deposited in Library of Congress, Mar. 12, 1946. (English translation available in Oxo Process, Meyer Translation PC-S-V, Chas. A. Meyer & Co. Nyack, N.Y., pp. 62-63.)